(12) United States Patent
Cakmakci et al.

(10) Patent No.: US 9,429,756 B1
(45) Date of Patent: Aug. 30, 2016

(54) TRANSPARENT MICRODISPLAY IN HEAD MOUNTABLE DISPLAYS

(71) Applicant: Google Inc., Mountain View, CA (US)

(72) Inventors: Ozan Cakmakci, Sunnyvale, CA (US); Anurag Gupta, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 225 days.

(21) Appl. No.: 13/928,725

(22) Filed: Jun. 27, 2013

(51) Int. Cl.
*G02B 27/14* (2006.01)
*G09G 5/00* (2006.01)
*G02B 27/01* (2006.01)

(52) U.S. Cl.
CPC .................................. *G02B 27/0172* (2013.01)

(58) Field of Classification Search
USPC .................. 359/631, 630; 345/7, 9
See application file for complete search history.

(56) References Cited

U.S. PATENT DOCUMENTS

| | | |
|---|---|---|
| 5,625,372 A | 4/1997 | Hildebrand et al. |
| 5,754,344 A | 5/1998 | Fujiyama |
| 6,603,443 B1 | 8/2003 | Hildebrand et al. |
| 8,441,733 B2 | 5/2013 | Kessler |
| 2010/0290127 A1 | 11/2010 | Kessler et al. |

OTHER PUBLICATIONS

Cakmakci, O. et al., "Head-Worn Displays: A Review," Journal of Display Technology, vol. 2, No. 3, Sep. 2006, pp. 199-216, IEEE.
"Press Release: LG Shows Its First OLED TV With Curved Screen." lg.com. LG Electronics, Inc. Web. Jan. 14, 2013. Retrieved Jun. 7, 2013, from: http://www.lg.com/au/press-release/lg-shows-its-first-oled-tv-with-curved-screen.

*Primary Examiner* — Jack Dinh
(74) *Attorney, Agent, or Firm* — Blakely Sokoloff Taylor & Zafman LLP (57) ABSTRACT

An optical apparatus includes a transparent microdisplay and a curved mirror. The transparent microdisplay has an array of self-illuminating emitters configured to emit image light propagating in an external direction. The curved mirror is positioned to reflect the image light toward an eye-ward side of the optical apparatus. A first curvature of the curved mirror has an optical power configured to focus the image light reflected by the curved mirror within an eyebox sized area. The transparent microdisplay is disposed between the curved mirror and the eyebox sized area.

24 Claims, 8 Drawing Sheets

TRANSPARENT MICRODISPLAY IN HEAD MOUNTABLE DISPLAYS

TECHNICAL FIELD

This disclosure relates generally to the field of optics, and in particular but not exclusively, relates to transparent microdisplays in Head Mountable Displays ("HMDs").

BACKGROUND INFORMATION

In the field of optics, a combiner is an optical apparatus that combines two images together, from either the same side of the combiner (reflective/reflective, or transmissive/transmissive) or from the two different sides of the combiner (reflective/transmissive). Often times, optical combiners are used in heads up displays ("HUDs"), sometimes referred to as head mountable displays ("HMDs") or near-to-eye displays, which allow a user to view a display image superimposed over an external view. The HUD enables the user to view the display image without having to look away from her usual viewpoint. The term HUD originated from its use in avionics, which enabled a pilot to view information while looking forward with his head up, as opposed to looking down at an instrument panel. Conventional HUD combiner implementations include tilted dichroic plates, holographic combiners, transparent substrates used at an angle (e.g., beam splitters), and zero power shells. Two versions of combiners exist. The first version combines two fields without adding any optical power to either field (typically a tilted dichroic plate or zero power shell). The second version has optical power, in addition to the combining functionality. The optical power is used to form a virtual magnified image of a microdisplay located at a specific distance from the combiner. Field of view is set by the application requirements. The field of view and the desired microdisplay diagonal determine the focal length (inversely related to the optical power) of the optical combiner.

The above mentioned optical combiners each have their own respective drawbacks, which have limited their use to niche markets. In order to broaden the adoption of an HMD outside of a particular niche market, such an HMD would ideally be implemented with a low cost optical combiner that is compact, lightweight, durable, and provide a good quality image without undue optical aberration.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and a system for utilizing a transparent microdisplay in a head mountable display ("HMD") are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
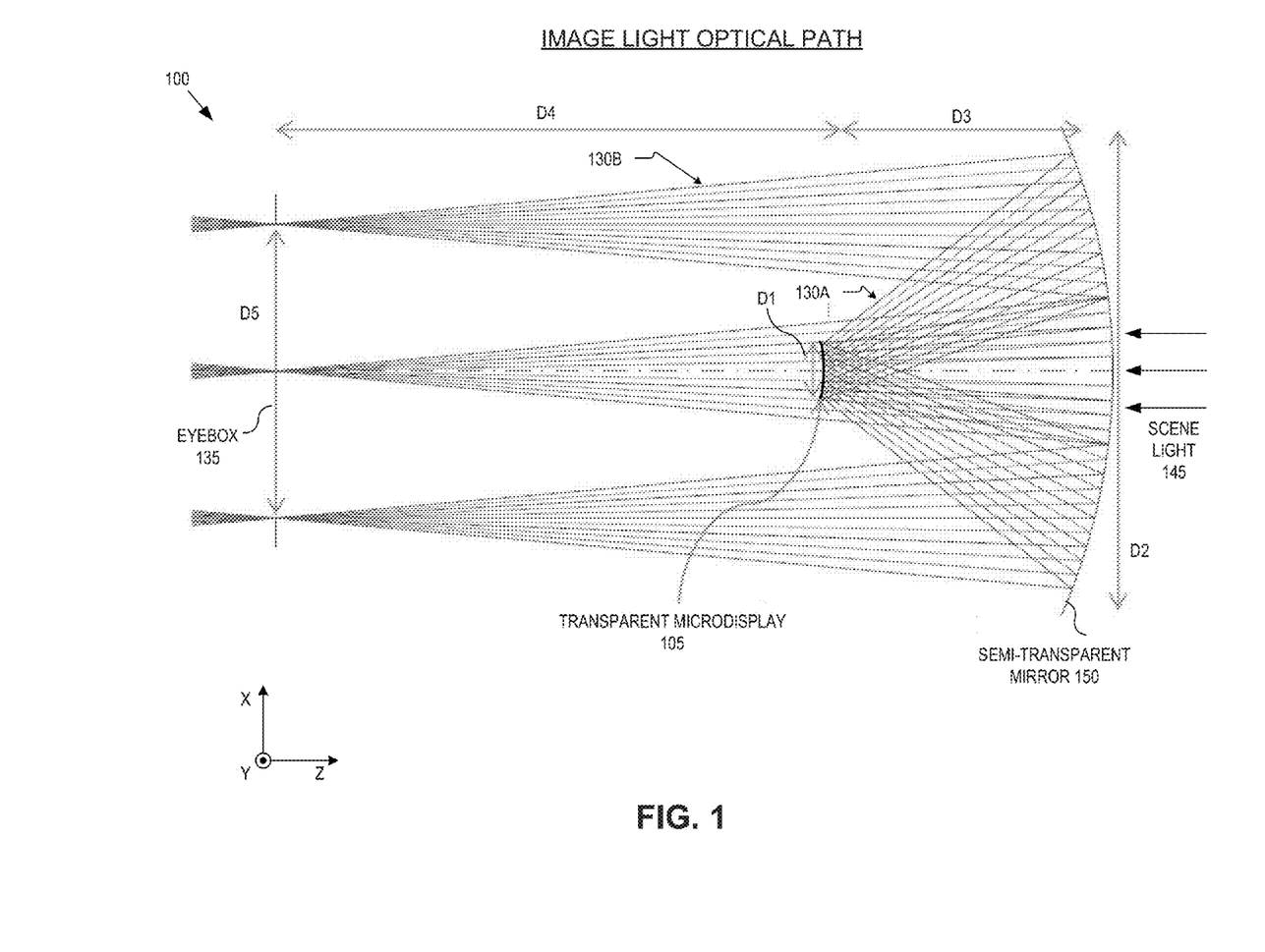
FIG. 1 illustrates an example optical system including a transparent microdisplay and a curved mirror directing image light into an eyebox area, in accordance with an embodiment of the disclosure.

FIG. 1 illustrates an example optical system 100 including a transparent microdisplay 105 and a curved semi-transparent mirror 150 directing image light 130 into an eyebox area 135, in accordance with an embodiment of the disclosure. Optical system 100 may be positioned in front of a user's eye as an optical combiner in order to facilitate superimposing image light 130 over external scene light 145. Transparent microdisplay 105 may include a pixel array of self-illuminating emitters. The pixel array may be arranged in rows and columns. The pixel array may be monochromatic or include different colors such as red, green, and blue ("RGB"). In one embodiment, each pixel in the pixel array includes four sub-pixel arranged in an RGGB Bayer pattern.

In one embodiment, transparent microdisplay 105 includes organic-light-emitting-diodes ("OLEDs") as the array of self-illuminating emitters. In transparent OLED (sometimes referred to as "TOLED") displays, the substrate, cathode, anode, emitting layer (between the cathode and anode) and even supporting transistors that select which pixels are driven can be transparent or substantially transparent. This transparency allows the microdisplay to both generate image light 130 and be transparent to external scene light 145.

In the illustrated embodiment of FIG. 1, dimension D1 is approximately 1.5 mm in the x-axis and transparent microdisplay 105 may have a dimension of approximately 1.5 mm in the y-axis.

In FIG. 1, transparent microdisplay 105 is illustrated as a curved transparent microdisplay. A curved transparent microdisplay may have a spherical curvature. In one embodiment, the radius of curvature of an image plane of the transparent microdisplay 105 is approximately −3.5 mm. In one embodiment, the curved transparent microdisplay has a toroidal curvature. To build a curved transparent microdisplay, a curved base substrate having the desired curvature may be fabricated of a variety of clear optically transmissive materials, including acrylic, thermo-plastics, poly-methyl-metha-crylate (PMMA), ZEONEX E48R, glass, quartz, etc. Then, a flexible transparent OLED array that is manufactured separately may be made to conform to the curvature of the curved base substrate. In another embodiment, a curved substrate is produced and an OLED array is manufactured layer-by-layer on the curved base substrate, which gives the OLED array the curvature of the curved base substrate. The layers of the OLED array may be disposed (built up) on the curved substrate using conventional vapor deposition techniques or by conventional processes similar to inkjet printing.

In operation, transparent microdisplay 105 emits image light 130A in an external direction toward curved semi-transparent mirror 150. Curved semi-transparent mirror 150 may be a partially silvered mirror and may reflect a portion (e.g. 50%) of image light 130A as reflected image light 130B while transmitting the remaining portion (e.g. 50%) of image light 130A. Curved semi-transparent mirror 150 is positioned to reflect image light 130A as reflected image light 130B in an eye-ward direction toward eyebox 135. In one embodiment, dimension D5 of eyebox 135 is circular diameter of 8 mm. The curvature of curved semi-transparent mirror 150 can be configured to focus image light 130 within eyebox 135. In one example, curved semi-transparent mirror 150 is configured to substantially collimate image light 130 in order to bring image light 130 to be focused for a user to read or view images presented in image light 130. In one embodiment, the distance between mirror 150 and a targeted focusing plane of eyebox 135 is approximately 23 mm. Curved semi-transparent mirror 150 may be an on-axis mirror. The center of mirror 150 may be axially aligned with a center of transparent microdisplay 105.

Figure 2:
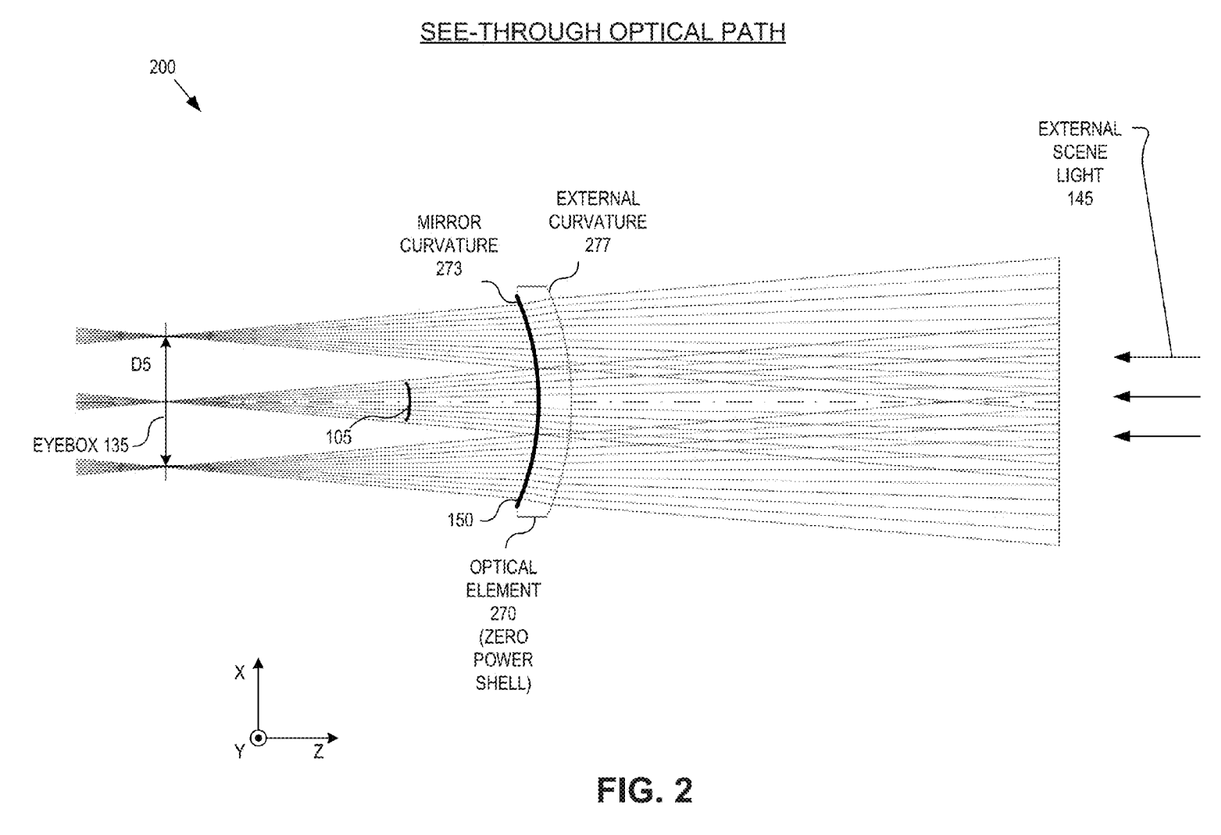
FIG. 2 illustrates an example optical system including a transparent microdisplay and a curved mirror that allows external scene light to propagate into an eyebox area, in accordance with an embodiment of the disclosure.

In one embodiment, mirror curvature 273 (shown in FIG. 2) is rotationally symmetric and aspherical to correct for spherical aberration. In one embodiment, mirror curvature 273 is defined by Equation (1):

$$z(r) = \frac{cr^2}{1 + \sqrt{1 - c^2 r^2 (1+k)}} + Ar^4 + Br^6 + \ldots$$

where c represents the base curvature at the vertex, k represents the conic constant, r represents the radius from the optical axis, and A & B represent coefficients of the fourth and sixth order aspheric terms, respectively. Other higher order terms may be added to Equation (1), if needed. In one embodiment, z(r) may be defined with the following coefficients A=1.64e-005, B=0, and c=−1/16. Mirror curvature 273 may be defined using other values for coefficients A, B, and c.

It is appreciated that there may be a transparent material between transparent microdisplay 105 and curved semi-transparent mirror 150 to properly position them in a set location. In one embodiment, microdisplay 105 and mirror 150 are separated by a dimension D3 of approximately 8 mm. Mirror 150 may have a circular diameter (dimension D2) of 12 mm.

Figure 3:
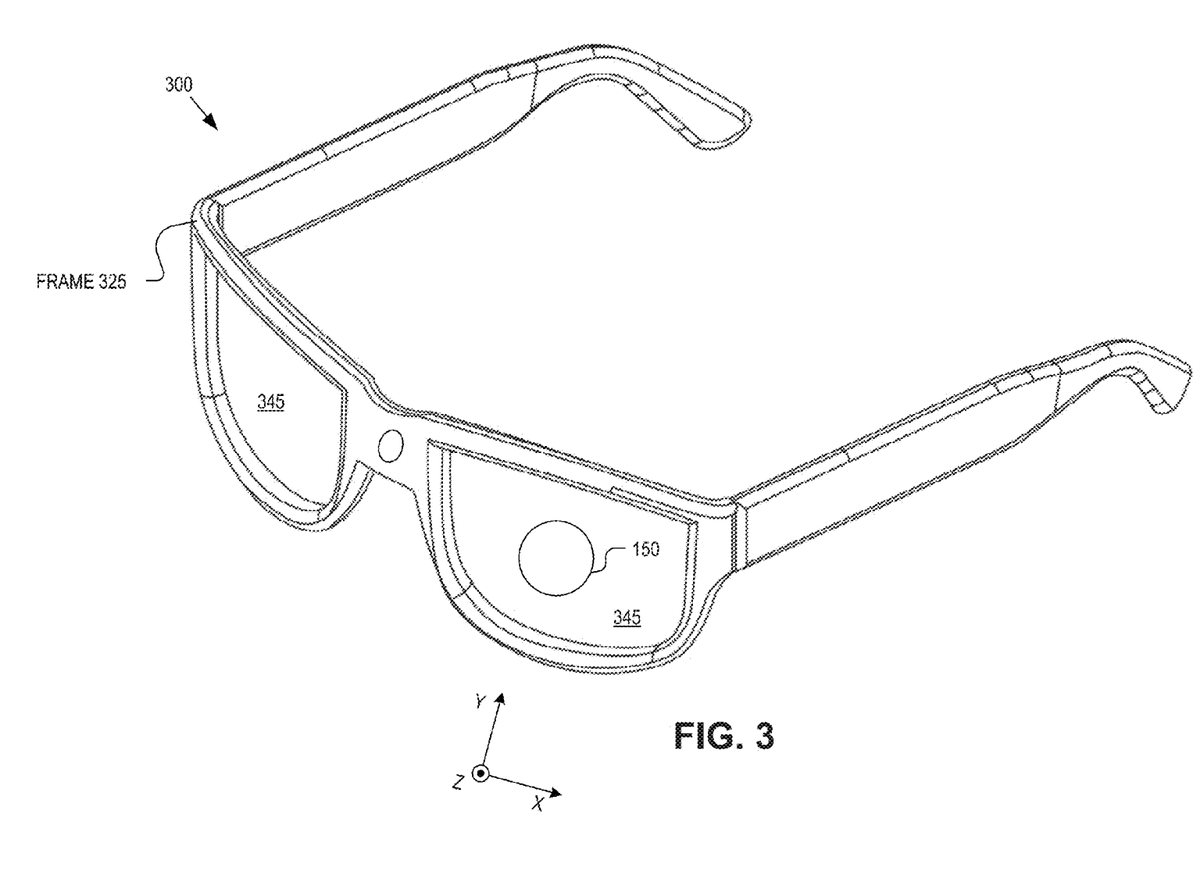
FIG. 3 shows a curved mirror fixed in a lens of a head mountable display, in accordance with an embodiment of the disclosure.

FIG. 3 shows an example view of curved mirror 150 in an example where curved mirror 150 and microdisplay 105 (not shown) are fixed in a lens 345 of an HMD 300. It is understood that optical system 100 (or optical system 200 described below) may be implemented in one or both lenses of HMD 300. Curved mirror 150, transparent microdisplay 105, and a transparent material disposed between mirror 150 and microdisplay 105 may be referred to as an "optical combiner" or an "eyepiece." In one example, the optical combiner provides a 10 degree field of view for a virtual image, using image light 130.

FIG. 2 illustrates optical system 200 allowing external scene light 145 to propagate through the transparent microdisplay 105 and through curved mirror 150 into eyebox area 135, in accordance with an embodiment of the disclosure. In the illustrated embodiment, the curved mirror 150 is disposed along an eye-ward facing surface of an optical element 270 that has a zero power shell. The eye-ward facing surface of optical element 270 has a mirror curvature 273 (which may be spherical). An external surface of optical element 270 is disposed substantially opposite of the eye-ward facing surface and has external curvature 277. The external surface having external curvature 277 may be configured to give optical element 270 substantially zero optical power from the perspective of external scene light 145 encountering the optical element, as external scene light 145 propagates in an eye-ward direction toward eyebox 135. In other words, external scene light 145 that is incident through the external surface of optical element 270 continues to travel substantially along the same optical path as it propagates through optical element 270 because, in one example, the external curvature 277 follows mirror curvature 273 to facilitate a zero power shell. In one embodiment, the radius of mirror curvature 273 is −16 mm while the radius of external curvature 277 is −16.875 mm with a thickness of optical element 270 being approximately 2 mm between mirror curvature 273 and external curvature 277.

Having optical system 200 configured with a zero power optical shell allows external scene light 145 to continue propagating undistorted toward eyebox 135. When external scene light 145 encounters semi-transparent mirror 150, a portion of the external scene light 145 will be reflected, while the remaining portion will continue propagating toward eyebox 135. As shown in FIG. 2, some of external scene light 145 will also encounter microdisplay 105. If microdisplay 105 is transparent or substantially transparent, a large portion (if not all) of external scene light 145 that encounters transparent microdisplay 105 will continue propagating uninterrupted toward eyebox 135. Consequently, on a macro level, optical system 200 allows mirror 150 to have (magnifying) optical power in reflection of image light 130, while having substantially zero optical power in transmission of external scene light 145. This allows a user of optical system 200 to view magnified image light 130 without substantially distorting a view of the outside world.

In one embodiment, optical element 270 has transmissive optical power that focuses external scene light 145. If optical element 270 has transmissive optical power to focus external scene light 145, the transmissive optical power may be configured to correct the vision of a wearer of a head mountable display ("HMD") that incorporates optical system 200, in accordance with this disclosure.

Transparent OLED displays are typically bi-directional because the components are transparent and the pixels emit light that inevitably propagates both in front and behind the display. However, a bi-directional transparent OLED that emits an image directly into a user's eye (as well as toward a curved mirror) may not be ideal. In one embodiment, a transparent OLED display included in transparent micro display 105 is configured for one-sided emission. To achieve one-sided emission with a transparent OLED display, light directing structures that direct the emitted image light in the proper direction should be included within the transparent microdisplay.

Figure 4A:
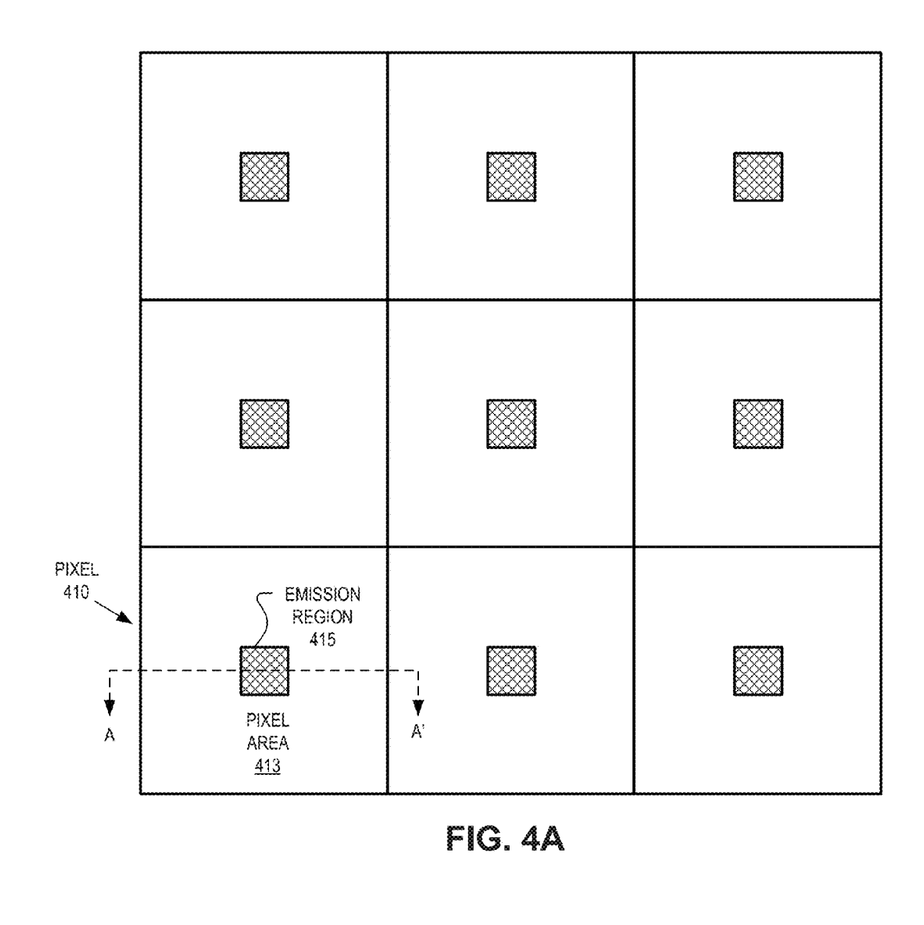
FIGS. 4A and 4B illustrate example pixels of an example transparent microdisplay, in accordance with an embodiment of the disclosure.

FIG. 4A illustrates a top view of example pixels of a transparent microdisplay that may be used as transparent microdisplay 105, including embodiments where microdisplay 105 is a curved transparent microdisplay. Pixel 410 has a pixel area 413 that includes emission region 415. Emission region 415 is a relatively small percentage (e.g. 5%) of pixel area 413.

Figure 4B:
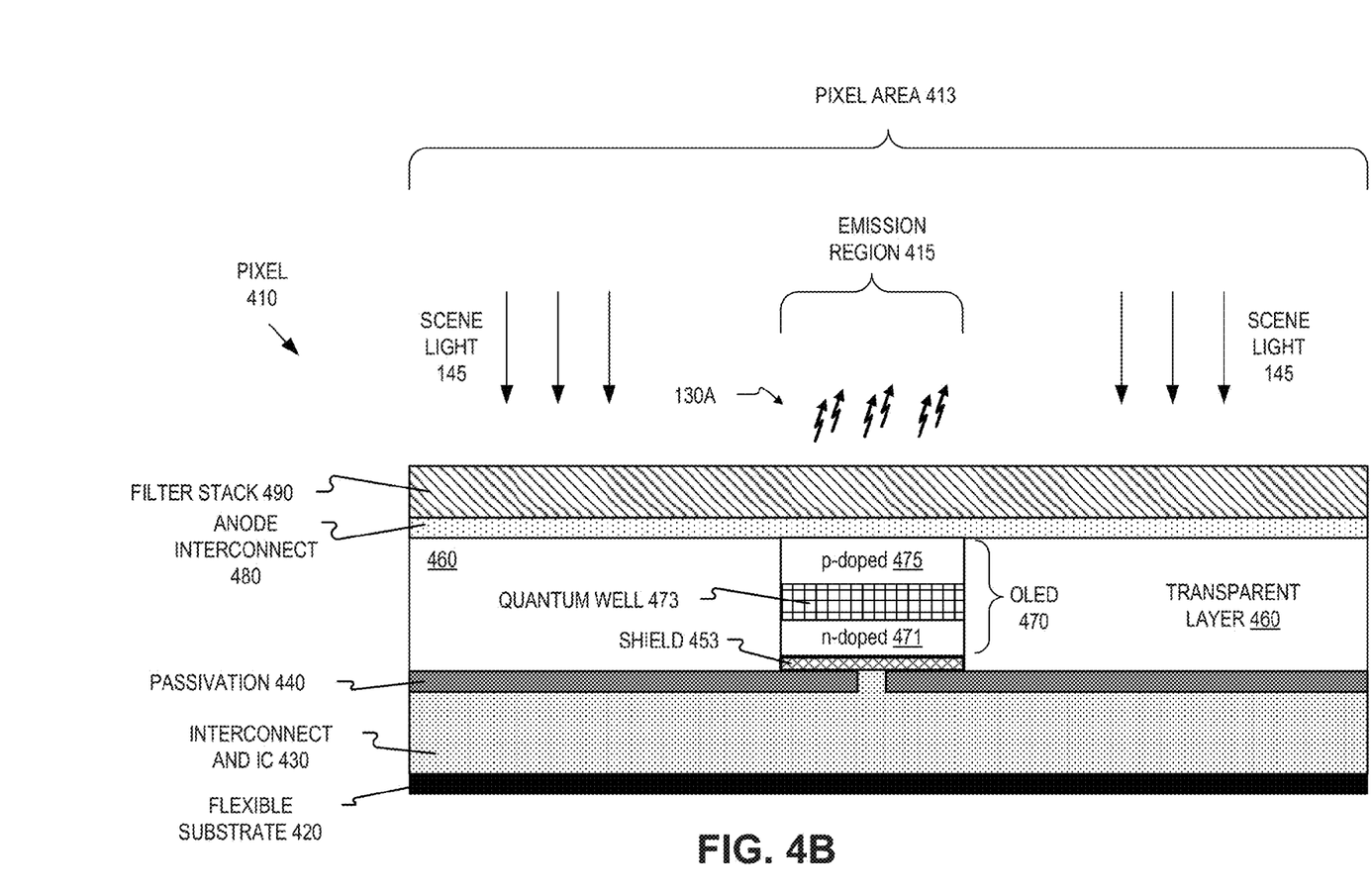

FIG. 4B illustrates a cross section of pixel 410 through line A-A' in FIG. 4A, in accordance with an embodiment of the disclosure. In the illustrated embodiment, pixel 410 includes an interconnect and integrated circuit ("IC") layer 430 disposed on flexible transparent substrate 420. Interconnect and IC layer 430 may include electrical structures such as transistors that drive OLED structure 470. Passivation layer 440 may be formed on top of interconnect and IC layer 430 for electrical isolation. In FIG. 4B, interconnect and IC layer 430 extends through passivation layer 440 in order to make electrical connection (through shield 453) with OLED structure 470.

A shield layer is formed over passivation layer 440 and patterned into shield(s) 453, which are an example of light directing structures that direct the emitted image light. OLED structure 470 is then formed over shield 453. In the illustrated embodiment, OLED structure 470 includes a quantum well layer 473 disposed between n-doped semiconductor layer 471 and p-doped semiconductor layer 475. The composition of semiconductor layers 471 and 475 will depend on the desired emission wavelength of OLED 470. For color displays, red, green, and blue pixels 410 may be formed in close proximity to make a red/green/blue pixel. Transparent layer 460 is disposed around OLED structure 470. Transparent layer 460 may need to be formed in layers along with the formation of OLED structure 470. Anode interconnect 480 is formed above OLED structure 470 and is electrically connected to p-doped semiconductor layer 475. Additional contact layers (not illustrated) of OLED 470 may be formed to facilitate electrical connections between semiconductor layers 471 and 475. A filter stack layer 490 may be optionally formed over anode interconnect layer 480.

When OLED structure 470 of pixel 410 is driven "ON" it emits display light 130A toward mirror 150. Shield 453 serves to absorb or reflect emitted light generated by OLED 470 so that the emitted light is not directed (at least directly) into eyebox 135. Shield 453 is electrically conductive so that it can connect n-doped semiconductor region (the cathode of OLED 470) to interconnect and IC layer 430. Where shield 453 is reflective (rather than an absorber), it may be a thin layer of silver (electrically conductive) deposited to be used as a mirror.

As OLED 470 is turned "ON," scene light 145 propagating toward eyebox 135 may encounter pixel 410 in transparent microdisplay 105. A portion of scene light 145 will be reflected or absorbed by shield 453. However, most of scene light 145 will continue propagating toward eyebox 135 because of the transparency of the rest of the transparent structure of pixels 410. As discussed above, transistors and layers of OLED displays can be manufactured so that they are transparent or substantially transparent by using transparent materials. Some layers may be transparent by virtue of the extremely thin depth of the layers, measured in Angstroms for example. Since shield 453 may only cover emission region 415 which is a small area (e.g. 5%) of pixel area 413, most of scene light 145 passes through pixel 410, making pixels 410 (and transparent microdisplay 105) substantially transparent to a user.

Referring back to FIG. 1A, in one embodiment, transparent microdisplay 105 can be replaced with a curved microdisplay that is not transparent. In this embodiment, the optical system would be an occluded system, but the occlusion of the microdisplay would be sufficiently small as to not significantly degrade a user's overall view of external scene light from the outside world.

In embodiments where transparent microdisplay 105 is substantially planar (and not curved), additional optics may be disposed between mirror 150 and transparent microdisplay 105 to direct image light 130A to mirror 150. Traditionally, a field lens is used to flatten the field. The additional optics may include a field lens in front of a flat lens to generate the effect of a concave lens. However, in embodiments where a flat transparent display is used, the additional optics may affect a user's view of external scene light 145.

With a curved display (having a curved image plane), designers don't have to correct for "field curvature" by using a negative optical element to "flatten" the field. Instead, the curved transparent microdisplay emits a curved image plane that is simply reflected by curved mirror 150. Embodiments with a curved transparent microdisplay and curved mirror 150 potentially enjoy the advantage of reducing or even eliminating color aberration from image light 130B because additional lenses may not be required in the optical system. Additional intervening lenses can cause (and then require correction of) color aberration in image light 130 because of dispersion introduced by intervening lenses focusing different wavelengths of light. In curved microdisplay embodiments, the curved transparent microdisplay emits a curved image plane that is simply reflected by curved mirror 150 (without dispersion) and doesn't necessarily propagate through diffractive or refractive lenses that operate differently for different colors of light, creating color aberration. Without needing additional lenses, the optical system can potentially be built lighter and more cost effective while still providing multi-color image light without color aberration.

It is appreciated that some "transparent" microdisplays may include a small portion of non-transparent components (e.g. metal) in targeted locations of the transparent microdisplays. This may give the "transparent" microdisplays a certain percentage of perceived transparency (e.g. 85%). However, for the purposes of this disclosure, the term "transparent" when used to describe a microdisplay shall include examples where the microdisplay includes non-transparent components, but where the transparent microdisplay still offers the user an acceptable view of external objects. In other word, the non-transparent components of the transparent microdisplay are not large enough optical occlusions to substantially degrade a user's perception of external scene light 145 propagating through the transparent microdisplay when an eye of the user is focused beyond the near-field.

Figure 5:
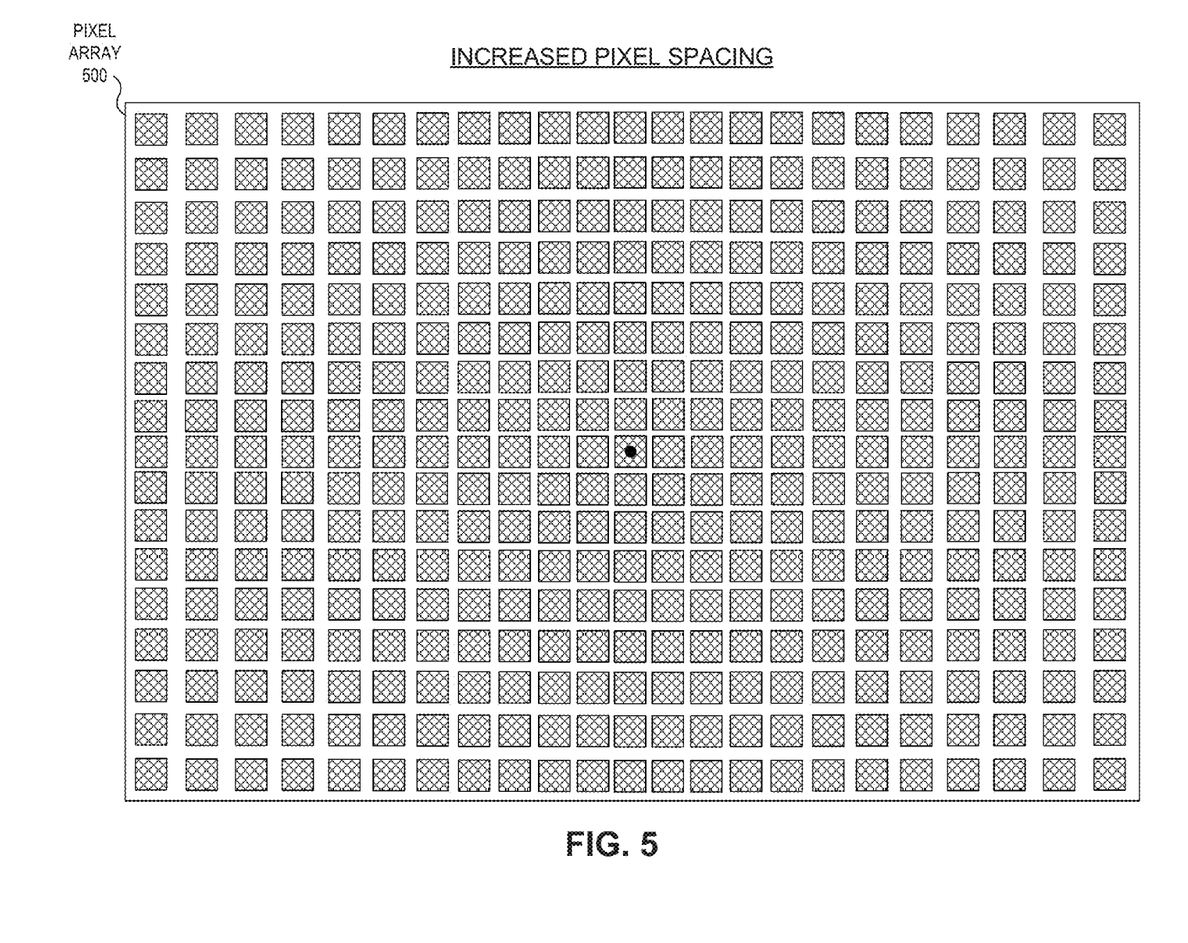
FIG. 5 illustrates an example pixel array of self-illuminating emitters that are spaced increasingly farther apart as the pixels get farther from the center of the array, in accordance with an embodiment of the disclosure.

FIG. 5 illustrates an example pixel array 500 of self-illuminating emitters that are spaced increasingly farther apart as the pixels get farther from the center of pixel array 500, in accordance with an embodiment of the disclosure. Increasing the pixel spacing of pixel array 500 as the pixels move farther from a center of the pixel array (notated by black dot in FIG. 5) allows improvement to the Modulation Transfer Function ("MTF") of imaging system 100 when the center of mirror 150 corresponds (e.g. is axially aligned with) to the center of pixel array 500. Therefore, increasing pixel density in the center of pixel array 500 allows for taking advantage of the higher MTF in the center, while the reduced pixel density at the edges of pixel array 500 reduces power consumption of pixel array 500 by reducing the overall number of addressable pixels in pixel array 500.

Figure 6:
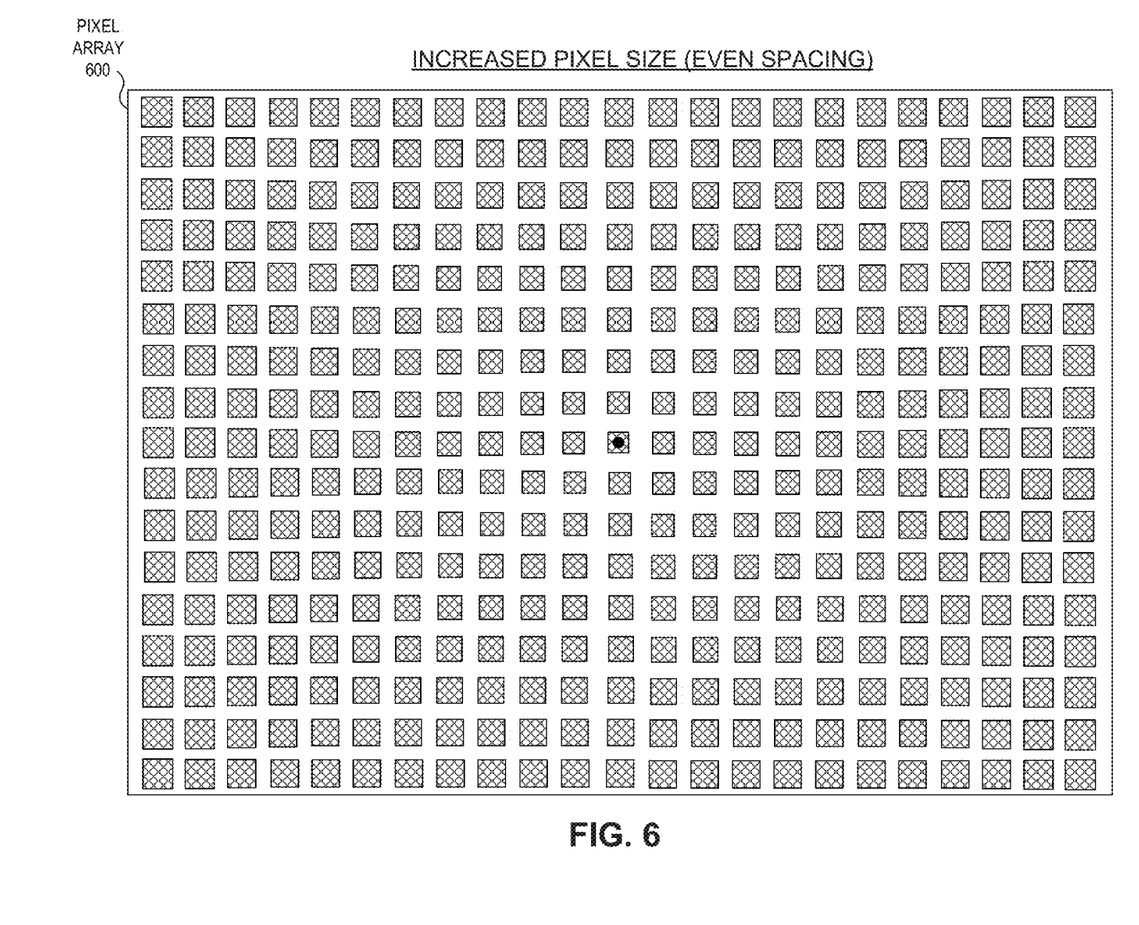
FIG. 6 illustrates an example pixel array of self-illuminating emitters that increase in pixel sizing as the pixels get farther away from the center of the array, in accordance with an embodiment of the disclosure.

FIG. 6 illustrates an example pixel array 600 of self-illuminating emitters that increase in pixel sizing as the pixels get farther away from the center of pixel array 600, in accordance with an embodiment of the disclosure. Increasing the pixel size of pixels as the pixels get further from the center of pixel array 600 increases the signal to noise ratio with regard to illumination fall off.

Figure 7:
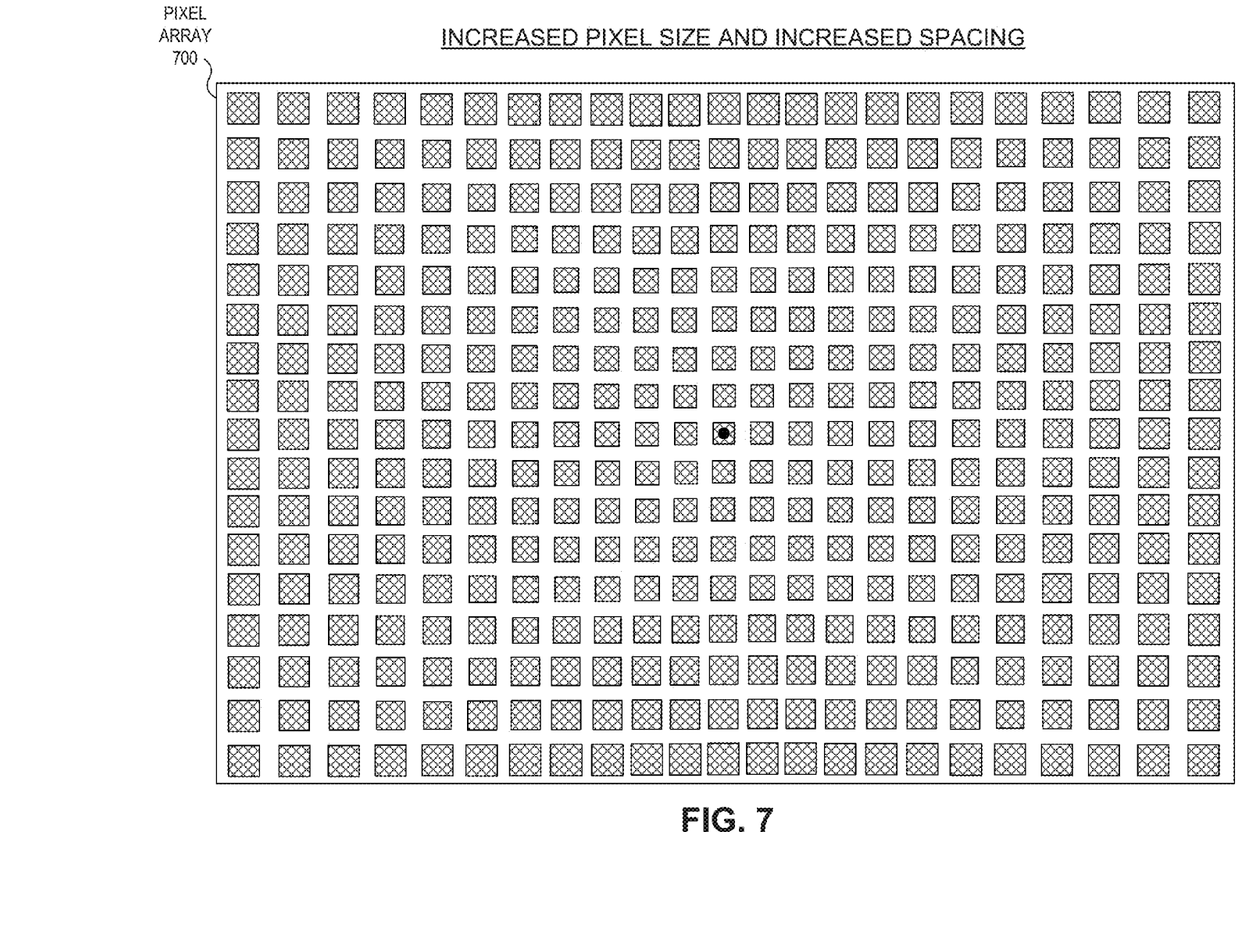
FIG. 7 illustrates an example pixel array of self-illuminating emitters that increase in pixel sizing and increase in pixel spacing as the pixels get farther away from the center of the array, in accordance with an embodiment of the disclosure.

FIG. 7 illustrates an example pixel array 700 of self-illuminating emitters that increase in pixel sizing and increase in pixel spacing as the pixels get farther away from the center of pixel array 700, in accordance with an embodiment of the disclosure. Since pixel array 700 has both increased pixel sizing and increasing pixel spacing, pixel array benefits from the potential advantages of pixel arrays 500 and 600, discussed in association with FIGS. 5 and 6.

Pixel arrays 500, 600, and 700 are example configurations of self-illuminating emitter (e.g. OLED) pixel arrays that could be used in transparent microdisplay 105. In FIGS. 5, 6, and 7, the center of the pixel array is notated by a black dot. If transparent microdisplay 105 is a curved display, the example pixel arrays 500, 600, and 700 may be flexible pixel arrays that can conform to the curvature of a curved optical element such as optical element 270.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical apparatus comprising:
a transparent microdisplay having an array of self-illuminating emitters configured to emit image light propagating in an external direction, wherein the transparent microdisplay includes transparent and non-transparent components, and wherein the transparent microdisplay is configured to allow a viewer to view light propagating through the transparent microdisplay when an eye of the viewer is focused beyond a near-field; and
a curved mirror positioned to reflect the image light toward an eye-ward side of the optical apparatus, wherein a first curvature of the curved mirror has an optical power configured to focus the image light reflected by the curved mirror within an eyebox sized area, the transparent microdisplay disposed between the curved mirror and the eyebox sized area, and wherein the image light is reflected by the curved mirror and directed in part through the transparent microdisplay into the eyebox sized area.

2. The optical apparatus of claim 1, wherein the transparent microdisplay is a curved transparent microdisplay, and wherein the array of self-illuminating emitters conforms to a second curvature of the curved transparent microdisplay.

3. The optical apparatus of claim 2, wherein the curved mirror is an on-axis mirror that is axially aligned with a center of the curved transparent microdisplay.

4. The optical apparatus of claim 2, wherein the curved mirror is disposed along an eye-ward facing surface of an optical element, the eye-ward facing surface having the first curvature, and wherein the optical element includes an external surface disposed substantially opposite of the eye-ward facing surface, the external surface configured to give the first optical element substantially zero transmissive optical power from the perspective of external scene light encountering the optical element, the external scene light propagating in an eye-ward direction.

5. The optical apparatus of claim 2, wherein pixels of the array of self-illuminating emitters are spaced increasingly farther apart as the pixels get farther from a center of the array.

6. The optical apparatus of claim 2, wherein pixels of the array of self-illuminating emitters have non-uniform pixel sizing, and wherein the non-uniform pixel sizing includes pixels of the array increasing in size as the pixels move farther from a center of the array.

7. The optical apparatus of claim 2, wherein the first curvature is spherical and the second curvature is spherical.

8. The optical apparatus of claim 2, wherein the second curvature is toroidal.

9. The optical apparatus of claim 1, wherein the array of self-illuminating emitters includes light directing structures that facilitate one-sided emission by directing the emitted image light in the external direction.

10. The optical apparatus of claim 1, wherein the array of self-illuminating emitters is an organic-light-emitting-diode ("OLED") array that includes pixels arranged in rows and columns.

11. The optical apparatus of claim 1, wherein the mirror is semi-transparent.

12. The optical apparatus of claim 1, wherein the first curvature is a spherical curvature.

13. The optical apparatus of claim 1, wherein the transparent microdisplay is substantially planar, and wherein a field lens is disposed between the transparent microdisplay and the curved mirror.

14. The optical apparatus of claim 1, wherein the image light reflected by the curved mirror travels through the transparent microdisplay en route to the eyebox sized area.

15. A head mountable display ("HMD") for combining image light with external scene light, the HMD comprising:
   a frame assembly for wearing on a head of a user; and
   an optical apparatus supported by the frame assembly, the optical apparatus comprising:
      a transparent microdisplay having an array of self-illuminating emitters configured to emit image light propagating in an external direction, wherein the transparent microdisplay includes transparent and non-transparent components, and wherein the transparent microdisplay is configured to allow the user to view light propagating through the transparent microdisplay when an eye of the user is focused beyond a near-field; and
      a curved mirror positioned to reflect the image light toward an eye-ward side of the optical apparatus, wherein a first curvature of the curved mirror has an optical power configured to focus the image light reflected by the curved mirror within an eyebox sized area, the transparent microdisplay disposed between the curved mirror and the eyebox sized area, and wherein the image light is reflected by the curved mirror and directed in part through the transparent microdisplay into the eyebox sized area.

16. The HMD of claim 15, wherein the transparent microdisplay is a curved transparent microdisplay, and wherein the array of self-illuminating emitters conforms to a second curvature of the curved transparent microdisplay.

17. The HMD of claim 16, wherein the curved mirror is an on-axis mirror that is axially aligned with a center of the curved transparent microdisplay.

18. The HMD of claim 16, wherein the curved mirror is disposed along an eye-ward facing surface of an optical element, the eye-ward facing surface having the first curvature, and wherein the optical element includes an external surface disposed substantially opposite of the eye-ward facing surface, the external surface configured to give the first optical element substantially zero transmissive optical power from the perspective of the external scene light encountering the optical element, the external scene light propagating in an eye-ward direction.

19. The HMD of claim 16, wherein pixels of the array of self-illuminating emitters are spaced increasingly farther apart as the pixels get farther from a center of the array.

20. The HMD of claim 16, wherein pixels of the array of self-illuminating emitters have non-uniform pixel sizing, and wherein the non-uniform pixel sizing includes pixels of the array increasing in size as the pixels move farther from a center of the array.

21. The HMD of claim 16, wherein the first curvature is spherical and the second curvature is spherical.

22. The HMD of claim 15, wherein the array of self-illuminating emitters includes light directing structures that facilitate one-sided emission by directing the emitted image light in the external direction.

23. The HMD of claim 15, wherein the array of self-illuminating emitters is an organic-light-emitting-diode ("OLED") array that includes pixels arranged in rows and columns.

24. The HMD of claim 15, wherein the mirror is semi-transparent.

* * * * *